United States Patent [19]
Zweekly

[11] 3,889,330
[45] June 17, 1975

[54] LATERAL LOCK INDEXABLE INSERT CUTTING TOOL

[75] Inventor: Raymond Tibor Zweekly, Royal Oak, Mich.

[73] Assignee: The Valeron Corporation, Detroit (Oak Park), Mich.

[22] Filed: June 19, 1974

[21] Appl. No.: 480,975

[52] U.S. Cl. ............................................. 29/96
[51] Int. Cl. ............................................ B26d 1/00
[58] Field of Search .............................. 29/96, 98

[56] References Cited
UNITED STATES PATENTS

| | | | |
|---|---|---|---|
| 3,176,377 | 4/1965 | Milewski | 29/96 |
| 3,268,977 | 8/1966 | Diemond | 29/96 |
| 3,488,823 | 1/1970 | Wirfelt | 29/96 |
| 3,813,746 | 6/1974 | Price | 29/96 |

*Primary Examiner*—Harrison L. Hinson
*Attorney, Agent, or Firm*—Farley, Forster and Farley

[57] ABSTRACT

A cutting tool employing a polygonal, indexable cutting insert having a central aperture freely engageable with a fixed pin projecting from a single shouldered insert seat in a tool holder with a headed screw lock having a bevelled portion engaging a bevelled reaction surface in a plane normal to an adjacent insert side wall displaced from the center line of the pin to force the screw head laterally against the side wall to rotate the insert against the shoulder. Alternatively, the holder may have a pair of angularly disposed shoulders engaged by a pair of side walls of the insert with a headed locking pin rotationally forcing the insert into engagement with both shoulders.

8 Claims, 4 Drawing Figures

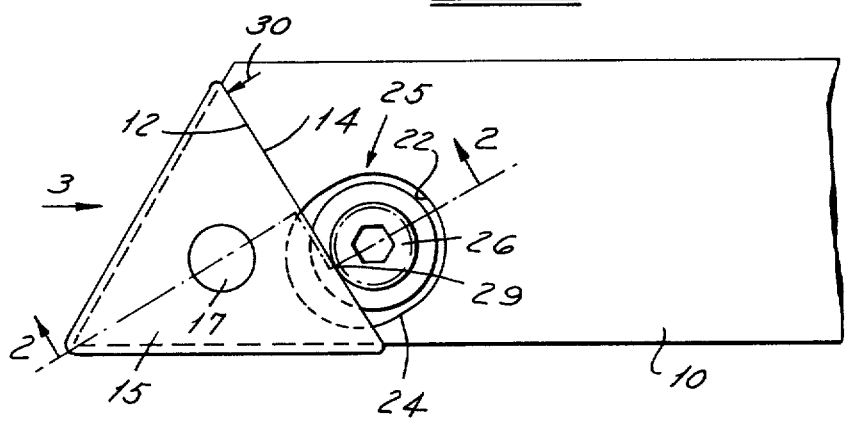
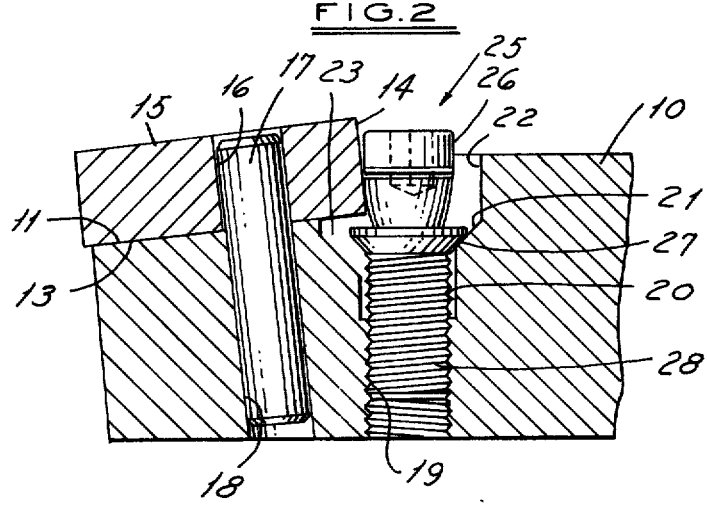
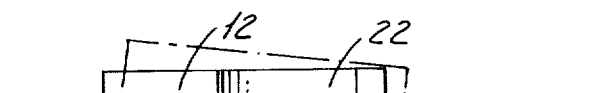
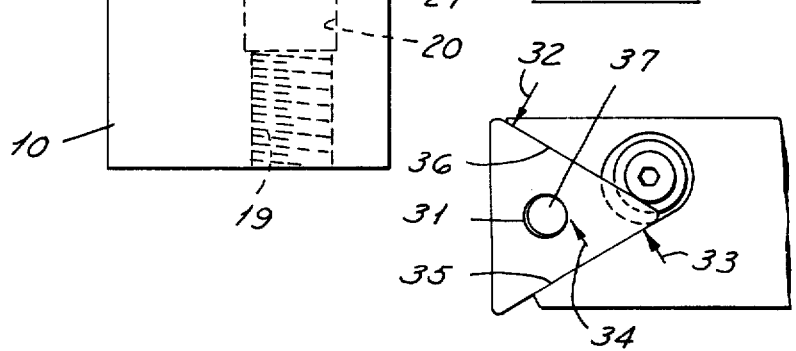

LATERAL LOCK INDEXABLE INSERT CUTTING TOOL

BACKGROUND OF THE INVENTION

The invention pertains to the field of cutting tools with indexable inserts having a central aperture for engaging a rigidly fixed pin projecting from an insert seat of a tool holder such as shown in U.S. Pat Nos. 3,176,377; 3,665,571; and British Pat. No. 1,107,634. In the first of these patents a wedge insert is employed between a shoulder of the holder and the cutting insert which is actuated by a screw to force a clamping surface of the wedge against one side of the insert and thus clamp the insert against the fixed pin projection. In the second of said patents a second fixed pin adjacent to the insert seat serves as a reaction shoulder emgaged by a side wall of the insert when actuated by an eccentric screw pin engaging a spaced portion of such side wall. The construction disclosed in the British patent is similar to that of the second U.S. patent except that a flat is provided on the second reaction pin to engage the side wall of the insert.

SUMMARY OF THE INVENTION

The cutting tool of the present invention employs a recessed seat for an indexable cutting insert with a fixed pin pressed in a hole extending normal to the seat and with one or a pair of shoulders of the holder projection from the insert seat for engagement by one or a pair of the side walls of the insert. A threaded hole in the insert intersecting a shoulder is provided with a conically bevelled reaction surface for engagement by a conical flange of a cylindrical locking screw the head of which is adapted to be forced laterally against the adjacent side wall surface of the insert exerting a normal force displaced from the axis of the fixed pin so as to provide a rotating force on the insert with the fixed pin acting as a pivot forcing a spaced portion of the insert side wall against the shoulder or shoulders of the holder. Where a second shoulder is employed, pressurized engagement of both shoulders is assured by providing a sufficient diametral clearance between the fixed pin and the aperture in the insert as hereafter explained.

DESCRIPTION OF THE DRAWINGS

FIG. 1 is a plan view of the tool;

FIG. 2 is a sectional elevation taken along the line 2—2 of FIG. 1;

FIG. 3 is an end view taken along the line 3 of FIG. 1 with the cutting insert shown in phantom; and FIG. 4 is an alternate design employing two locating shoulders in the holder.

DESCRIPTION OF THE PREFERRED EMBODIMENTS

With reference to FIGS. 1-3 a tool holder body 10 is provided with a recessed seat 11 and shoulder 12 for engaging respectively the bottom face 13 and side wall 14 of a triangular insert 15 having a central aperture 16 fitting over the projecting end of a fixed cylindrical pin 17 press fit in the hole 18, extending normal to the seat 11. A threaded hole 19 in the tool body is provided with a clearance counterbore 20 and a conically tapered reaction shoulder 21 extending between the counterbore 20 and an enlarged second counterbore 22 which intersects the shoulder 12. Additional clearance 23 is provided at the shoulder intersection as by shifting a conically pointed counterbore tool for cutting the respective counterbore surfaces 20, 21 and 22 in a direction toward the shoulder 12 for a short distance as shown by the elongated circular top opening 24 in FIG. 1; or by offsetting the axis of the counterbore to provide such clearance. The locking pin 25 is provided with a head 26 adapted to engage the side wall 14 of the cutting insert and is provided with a conically tapered flange 27 for engaging the conical surface 21 in the holder body when the threaded end 28 is screwed into the threaded hole 19 thus forcing the head of the pin 26 laterally against the side wall of the insert. A sufficiently looose thread and extensive counterbore 20 is provided to accommodate the necessary lateral movement of the locking pin head 26 to assure positive locking displacement. The locking pin axis may may be parallel to the fixed pin 17 or at a slight angle as shown which adds locking displacement. In the preferred embodiment both the angular relationship and conical reaction shoulder are used as shown. The offset spacing of the pressure point 29 in the plane of action normal to the insert side wall from the pivot pin 17 rotates the insert against the pressure reaction portion of the shoulder 12 providing a pressure reaction along line 30 locking the insert in position for cutting operations.

This construction is particularly well suited to small cutting tools where the provision of a laterally shiftable pin such as 25 at the center of the insert, such as shown in U.S. Pat. No. 3,341,920, is not feasible. Thus a simple cylindrical pin 17 of relatively small diameter press fit in the hole 18 will provide relatively greater rigidity and holding strength than a laterally shiftable pin of the same proportions and by locating the laterially shiftable pin in the tool body externally of the cutting insert relatively greater space is available for an adequately sized locking pin without unduly weakening the insert section between the center aperture and side wall.

In the two shoulder embodiment of FIG. 4 additional clearance 31 is provided between the respective diameters of the insert aperture and fixed pin to assure that the insert may be able to shift as required for pressure reaction at points 32 and 33 as well as the center pivot engagement point 34. Thus, in the embodiment of FIG. 1 a total of three pressure points of engagement are involved including the actuation pressure point 29, reaction at the fixed pin 17 and reaction at the pressure line 30 so that a close but free fit between the pivot pin 17 and hole 16 can in no way interfere with seating against the shoulder 12; whereas in the embodiment of FIG. 4 a total of four pressure points are involved and in the absence of adequate clearance 31 between the insert hole and pivot pin normal tolerance errors in the dimensional relationship of the two side walls 35, 36 and pivot pin 37 might result in clearance or inadequate pressure engagement at one of the two reaction pressure points 32 and 33.

From the above description of the two preferred embodiments it will be understood that an extremely simple and effective insert locking system has been provided which is ideal for small inserts. Although triangular inserts have been shown in both embodiments it will be understood that square or other polygonal inserts are adaptable to the same locking system.

I claim:

1. A cutting tool holder for supporting a removeable cutting insert having an aperture therethrough, said holder comprising:
   a body member,
   a fixed reaction surface for engaging a side wall of the insert
   a bottom seat surface for supporting the insert,
   pin means extending from said bottom seat surface positioned to extend into the aperture in the insert,
   insert locking means including a threaded hold in said body adjacent a side wall of said insert and spaced from said reaction surface, headed clamp screws means engaging said threaded hole, interengaging reaction surfaces in said body and screw acting in a plane normal to said adjacent side wall and adapted to laterally displace the head of said clamp screw in said plane and against said adjacent side wall upon rotative actuation of said clamp screw and thereby pivotally displace the insert against said fixed reaction surface to lock the insert in said holder, the principal three lines of force at said fixed reaction surface, pin, and screw head being substantially interspaced relative to each other to provide a leveraged side wall interaction about said pin as a fulcrum pivot.

2. A cutting tool holder as set forth in claim 1 in combination with a polygonal cutting insert having a plurality of side walls indexable to said leverage interaction position.

3. A cutting tool holder as set forth in claim 2 including a pair of angularly related fixed reaction surfaces for engaging a pair of said side walls.

4. A cutting tool holder as set forth in claim 3 including a substantial and sufficient clearance between said pin and insert aperture to assure four interspaced lines of substantial pressure engagement of the insert at the respective two fixed reaction surfaces, pin and screw head.

5. A cutting tool holder as set forth in claim 1 wherein said bottom seat is recessed to provide an integral fixed reaction surface for engaging said side wall.

6. A cutting tool holder as set forth in claim 3 wherein said bottom seat is recessed to provide a pair of integral fixed reaction surfaces for engaging said side walls.

7. A cutting tool holder as set forth in claim 1 wherein at least one of said interengaging reaction surfaces is a bevelled surface adjacent the head of said clamp screw providing reaction contact in said plane.

8. A cutting tool holder as set forth in claim 1 wherein said interengaging reaction surfaces comprise a pair of bevelled surfaces adjacent the head of said clamp screw providing a line of reaction contact in said plane.

* * * * *